United States Patent

Burroway

[11] Patent Number: 4,474,926
[45] Date of Patent: Oct. 2, 1984

[54] PROCESS FOR PRODUCING STABLE LARGE PARTICLE SIZE LATICES

[75] Inventor: Gary L. Burroway, Doylestown, Ohio

[73] Assignee: The Goodyear Tire & Rubber Company, Akron, Ohio

[21] Appl. No.: 462,595

[22] Filed: Jan. 31, 1983

[51] Int. Cl.³ ............................................. C08K 5/53
[52] U.S. Cl. .................... 524/710; 524/762; 524/377; 526/209; 526/193
[58] Field of Search ............ 524/710, 762, 377; 526/209, 193

[56] References Cited

U.S. PATENT DOCUMENTS

| | | | |
|---|---|---|---|
| 2,853,471 | 9/1958 | Beadell | 524/710 |
| 3,366,584 | 1/1968 | Zimmerman | 524/710 |
| 3,449,282 | 6/1969 | Lasher et al. | 524/710 |
| 3,844,990 | 10/1974 | Lindemann et al. | 526/209 |
| 4,287,329 | 9/1981 | Heimberg | 526/209 |

*Primary Examiner*—Paul R. Michl
*Assistant Examiner*—Alex H. Walker
*Attorney, Agent, or Firm*—Alvin T. Rockhill

[57] ABSTRACT

This invention relates to the preparation of stable large particle size latices for use in water reducible coatings. It specifically discloses an improved stable large particle size latex that is useful in the manufacture of water reducible coatings, comprising:

(a) a resin which is comprised of, based on 100 weight percent of monomeric units within the resin: (1) from about 50 to about 90 percent of at least one monomer selected from the group consisting of styrene, α-methyl styrene and vinyl toluene; (2) from about 10 to about 40 percent of at least one alkyl acrylate monomer wherein the alkyl moiety contains from 3 to 5 carbon atoms; and (3) from about 1 to about 10 percent of at least one unsaturated carbonyl compound selected from the group consisting of acrylic acid, methacrylic acid, fumaric acid, itaconic acid, maleic acid and maleic anhydride;

(b) water;

(c) at least one phosphate-ester surfactant and (d) as a secondary surfactant between about 0.01 and about 2 phr (parts per 100 parts of rubber) of at least one polyol which has a molecular weight between about 2,000 and about 20,000 which has the structural formula:

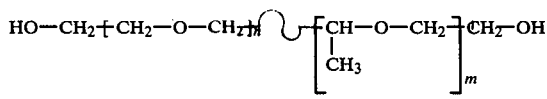

wherein n and m are integers, and wherein n is greater than m, and wherein Ω indicates that the distribution of monomeric units can be random.

20 Claims, No Drawings

PROCESS FOR PRODUCING STABLE LARGE PARTICLE SIZE LATICES

TECHNICAL FIELD

This invention relates to the preparation of stable large particle size latices for use in water reducible coatings. For purposes of this application, a water reducible coating is defined to be a colloidal dispersion of a resin in water which can be reduced by the addition of water and which forms a durable coating when applied to a substrate surface. Other names which are sometimes applied to water reducible coatings are water born, water solubilized, and water-dilutible.

BACKGROUND OF THE INVENTION

Generally, coating resins are insoluble in water. Therefore, in general practice they have been dissolved in a suitable organic solvent or dispersed in water with the aid of an emulsifying or surfactant agent in order to provide a coating composition suitable for application to a substrate surface. A serious disadvantage of organic solvent solutions is that they are potentially toxic, flammable, and environmental pollutants.

Water reducible coatings do not present these problems and are, therefore, highly desirable. For this reason it is expected that water reducible coatings will have a major share of the coating market in the future.

Many techniques are known for the production of latices for water reducible coatings but various difficulties are encountered with each of these techniques. For instance, it has been impossible to "scale up" many of these techniques to levels needed in actual commercial production. Instability of latex particles is a problem that has also often been encountered. For example, instability of latex particles can result in paint solidifying in its can before use. It is also desirable to produce a latex with large particle size. Many of the techniques presented in the prior do not accomplish this goal.

The present invention can be scaled up to a level needed for actual commercial production and produces stable large particle size latices. An additional benefit realized by using this invention is that substantially more latex can be produced in a given production facility.

SUMMARY OF THE INVENTION

This invention reveals an improved stable large particle size latex that is useful in the manufacture of water reducible coatings comprising, (a) a resin which is comprised of, based on 100 weight percent of monomeric units within the resin: (1) from about 50 to about 90 percent of at least one monomer selected from the group consisting of styrene, α-methyl styrene, and vinyl toluene; (2) from about 10 to about 40 percent of at least one alkyl acrylate monomer wherein the alkyl moiety contains from 3 to 5 carbon atoms; and (3) from about 1 to about 10 percent of at least one unsaturated carbonyl compound selected from the group consisting of acrylic acid, methacrylic acid, fumaric acid, itaconic acid, maleic acid and maleic anhydride;

(b) water;

(c) at least one phosphate-ester surfactant; and (d) as a secondary surfactant between about 0.01 and about 2 phr (parts per 100 parts of rubber) of at least one polyol which has a molecular weight between about 2,000 and about 20,000 which has the structural formula:

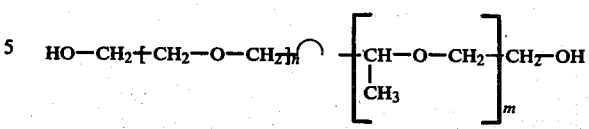

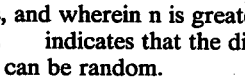

wherein n and m are integers, and wherein n is greater than m, and wherein ⌒⌒ indicates that the distribution of monomeric units can be random.

This invention also reveals an improved process for producing a latex which comprises free radical aqueous emulsion polymerizing, a monomer mixture which comprises, based on 100 weight percent of monomers (1) from about 50 to about 90 percent of at least one monomer selected from the group consisting of styrene, α-methyl styrene, and vinyl toluene; (2) from about 10 to about 40 percent of at least one alkyl acrylate monomer wherein the alkyl moiety contains from 3 to 5 carbon atoms; and (3) from about 1 to about 10 percent of at least one unsaturated carbonyl compound selected from the group consisting of acrylic acid, methacrylic acid, fumaric acid, itaconic acid, maleic acid and maleic anhydride; in the presence of at least one phosphate-ester surfactant and between about 0.01 and about 2 phm (parts per hundred parts of monomer) of at least one polyol which has a molecular weight between about 2,000 and about 20,000 which has the structural formula:

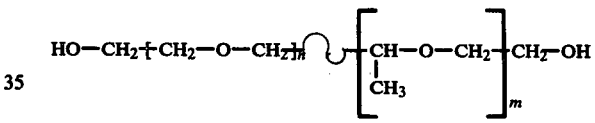

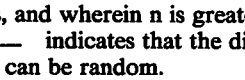

wherein n and m are integers, and wherein n is greater than m, and wherein ⌒⌒ indicates that the distribution of monomeric units can be random.

DETAILED DESCRIPTION OF THE INVENTION

It has been determined that the use of a polyol as a secondary surfactant in the synthesis of latices for water reducible coatings increases the particle size and stability of the latices formed. As a general rule, the stability of a latex improves with increasing particle size. This is because the surface area of the rubber particles per unit weight of rubber in the latex decreases with increasing particle size and therefore, there is not as much surface area per unit soap in the latex as particle size is increased. It is very desirable for the rubber particles in the latices of this invention to have a particle size (diameter) of at least 0.2μ (micron) and it is preferable for the size of the particles to be 0.25μ or greater. Since the stability of a latex improves with increasing particle size, it is possible to increase the solids content of a latex while maintaining excellent stability by employing the polyols of this invention as secondary surfactants to increase particle size. The achievement of higher solids contents while maintaining excellent latex stability is beneficial because substantially more latex can be produced in a given polymerization reactor or production facility per unit time.

The polyols that are useful in this invention as secondary surfactants for increasing particle size have molecular weights that range between about 2,000 and about 20,000. It is preferred for these polyols to have molecular weights of 5,000 to 20,000 and most preferred for them to have molecular weights of 10,000 to 15,000. Ethylene oxide can be polymerized into polyols that are useful in this invention. Ethylene oxide will readily react in the presence of aqueous hydroxide ions to produce polymers of various chain lengths (molecular weight) depending on the quantity of water present. This reaction is shown below:

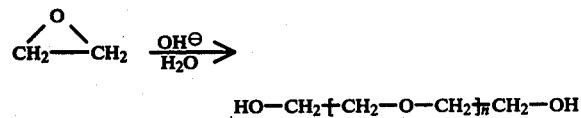

The molecular weight of the polyethylene oxide formed increases as the amount of water present in the polymerization is decreased. For instance in an excess of water only ethylene glycol will be produced (n is equal to 0) as the amount of water present in the polymerization is reduced n increases and n can reach a value of about 250 at a molecular weight of greater than 10,000. Polyethylene glycols are commercially available and are sold under the tradename "Carbowax TM". Carbowax TM 4000 has an average molecular weight of 3,000 to 3,700 and Carbowax TM 6,000 has an average molecular weight ranging from 6,000 to 7,500.

Ethylene oxide can also be copolymerized with propylene oxide to produce a polyol that is useful in this invention. The copolymers of ethylene oxide and propylene oxide that are useful in this invention can contain no more than 50 percent by weight propylene oxide repeat units. As the amount (percentage) of ethylene oxide repeat units in such a copolymer is increased the physical form of the polyol changes from a liquid to a paste to a prillable solid with the water solubility of these polyols also increasing. The polyols that are copolymer of ethylene oxide and propylene oxide have the structural formula:

wherein n and m are integers, and wherein ⌒⌒⌒ indicates that the distribution of chain linkages (monomeric units) derived from ethylene oxide and propylene oxide in the polymer chain can be random. Since the molecular weight of the polyols that are useful in this invention ranges between about 2,000 and about 20,000 the total of n plus m in such copolymers ranges between about 35 and 500. Since no more than 50 percent of this copolymers repeat units can be derived from propylene oxide, n must be greater than or equal to m. These polyols are unctuous wax-like solids which dissolve readily in water forming transparent solutions. Some polyols of this type that are commercially available from BASF Wyandott Corporation include Pluronic TM P-105, Pluronic TM F-127, and Pluronic TM F-108.

The charge compositions used in the preparation of the stable large particle sized latices of this invention contain monomers, water, a phosphate-ester surfactant, at least one polyol and at least one free radical initiator. The monomer charge composition used in this polymerization contains from about 50 to about 90 percent by weight, based on total monomers, of at least one monomer selected from the group consisting of styrene, α-methyl styrene, and vinyl toluene; from about 10 to about 40 percent by weight, based on total monomers, of an alkyl acrylate monomer wherein the alkyl moiety contains from 3 to 5 carbon atoms; and from about 1 to about 10 percent by weight, based on total monomers, of an unsaturated carbonyl compound selected from the group consisting of acrylic acid, methacrylic acid, fumaric acid, itaconic acid, maleic acid, and maleic anhydride. The ratio between the total amount of monomers present in the charge composition and water can range between about 0.2:1 and about 1.2:1. It is generally preferred for the ratio of monomers to water in the charge composition to be about 1:1.

The charge composition must also contain from about 1 to about 5 phm of a phosphate-ester surfactant. It is generally preferred to utilize 2.5 to 3 parts of a phosphate-ester surfactant based upon 100 parts of monomer (phm).

The phosphate ester surfactants that are useful in this invention are commercially available from a wide variety of sources. For instance, GAF Corporation sells phosphate ester surfactants under the tradename of Gafac TM, Gafac TM RE-410, Gaftax TM CD-169, and Gaftax TM DP-100. Some other phosphate-ester surfactants that are commercially available include Indoil TM (BASF Wyandotte Corporation), Emphos TM (Witco Chemical Corporation), Cyclophos TM (Cyclochemicals Corporation), Tryfac TM (Emery Industries), and Alcamet TM (Lonza, Inc.).

The charge composition must also contain from about 0.01 to about 2 phm of at least one polyol based upon the total charge composition. It is preferred for the charge composition to contain 0.03 to 0.4 phm of at least one polyol. It is more preferred for the charge composition to contain about 0.05 phm of at least one polyol. The polyols that are useful in this invention have previously been described and have the structural formula:

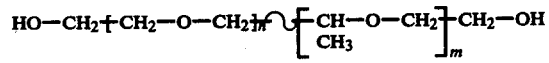

wherein n and m are integers.

A small amount ranging between about 0.01 and about 1 phm of at least one free radical initiator must be present in the charge composition. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butylperoxy)cyclohexane, and the like. Water soluble peroxygen free radical initiators are especially useful in such aqueous polymerizations.

After the charge composition is prepared this emulsion polymerization is carried out at a temperature ranging between about 100° F. (38° C.) and 170° F. (77° C.). It is preferred to conduct the polymerization at a temperature ranging from about 120° F. (50° C.) up to about 150° F. (65° C.). Such polymerizations are generally carried out for a period of time ranging between about 2 hours up to about 24 hours. A polymerization time of 8 to 10 hours is normally preferred.

After the polymerization is completed the latex formed can be diluted with additional water to the concentration (solids content) that is desired. This latex can be used in the preparation of water reducible coatings using techniques well-known to those skilled in the art. Generally, various pigments and plasticizers are added to the latex in the preparation of the water reducible coating. Such a latex can also be coagulated and dried using techniques well-known to those skilled in the art. The dry rubber produced can then be used in the manufacture of water reducible coatings if it is preferable to use a dry rubber. Poor adhesion is a problem that is sometimes encountered with water reducible resins that can be greatly improved by the addition of a plasticizer.

This invention is illustrated by the following examples which are merely for the purpose of illustration and are not to be regarded as limiting the scope of the invention or manner in which it may be practiced. Unless specifically indicated otherwise, parts and percentages are given by weight.

Particle sizes were determined on a Joyce-Loebl disc centrifuge manufactured by Vickers Instruments by using sedimentation velocity relationships. The sedimentation velocity relationship used is expressed by the equation:

$$D = \sqrt{\frac{\log r_2/r_1 \left(\frac{6.299 \times 10^9 (\eta)}{(N)^2 \Delta\rho}\right)}{T}}$$

wherein, $r_2$ is the distance of the point of detection from the center of the disc, $r_1$ is the distance of the injection point from the center of the disc, $\eta$ is the viscosity of the liquid used as the medium, N is the speed at which the disc is revolved in RPM (revolutions per minute), and $\Delta\rho$ is the difference between the density of the polymer and the liquid medium. In these examples, $\eta$ was 1 (water was the liquid used as the medium), N was 8000, $r_2$ was 4.82 cm. (centimeters), and $r_1$ was 4.56 cm. The relationship shown above can be reduced to the more simple relationship, $$D = \sqrt{.431/T}$$

wherein D is the diameter of the particles (particle size) and T is the sedimentation time.

EXAMPLES 1 THROUGH 5

In order to show the effect of polyols on particle size when they are employed as secondary surfactants in charge compositions this series of experiments was run. In this series of experiments the amount of polyol present in the charge composition was increased from 0 up to 0.4 phr.

In this series of experiments, charge compositions were prepared in a series of quart (946 ml) polymerization bottles. The charge compositions contained 100 parts of water, 0.11 parts of potassium hydroxide (KOH), 3.0 parts of Gafac TM RE 410 (a phosphate-ester surfactant produced by GAF), 71 parts of styrene, 26 parts of butyl acrylate, 1.0 parts of methacrylic acid, 2.0 parts of acrylic acid, 0.85 parts of Sulforle TM 120 (a dodecyl mercaptan chain transfer agent sold by Phillips Petroleum), 0.3 parts of potassium persulfate, 0.6 parts of sodium hydroxide, and the amount of Pluronic TM F-127 polyol specified in Table I. Pluronic TM F-127 has an average molecular weight of 12,500, a specific gravity of 1.05, a Brookfield Viscosity of 3100 cps (centipoise), a melting point of 56° C., and contains about 70 percent ethylene oxide repeat units.

After the charge compositions were prepared they were tumbled end-over-end in a water bath at 130° F. (54° C.) for about 90 hours. The particle sizes produced in this series of latices were then determined using a Joyce-Loebl disc centrifuge. Table I shows the relationship between the amount of Pluronic TM F-127 polyol used in the charge composition as a secondary surfactant and the particle size of the rubber in the latices produced.

TABLE I

| Example | Amount of Polyol Used (phm) | Particle Size ($\mu$) |
|---------|------------------------------|------------------------|
| 1 | 0.00 | 0.135 |
| 2 | 0.05 | 0.246 |
| 3 | 0.10 | 0.238 |
| 4 | 0.20 | 0.225 |
| 5 | 0.40 | 0.203 |

As can be seen by examining Table I, the particle size of the latex was increased dramatically by the use of small amounts of polyol. A maximum particle size was observed at a polyol concentration of 0.05 phm. As the level of polyol employed was increased above 0.05 phm the particle size of the latex decreased. Evidently the polyol functions as a particle generator and the number of particles formed increases with increasing polyol levels above a level of 0.05 phm and thus limits particle size at high polyol concentrations.

These examples show that a small amount of polyol can be added to a charge composition to produce a latex containing particles of large size which would otherwise be unacceptable (0.135$\mu$ in Example 1) where no polyol was present in the charge composition). It is very desirable for the polymer particles produced to have a particle size of at least 0.2$\mu$ which was achieved in Examples 2 through 5 by employing the polyol as a secondary surfactant.

EXAMPLES 6 AND 7

The same procedure that was specified in Examples 1 through 5 was utilized except that 0.2 phm of Pluronic TM P-105 and Pluronic TM F-108 were employed in place in the Pluronic TM F-127 as the secondary surfactant in Example 6 and Example 7, respectively. Pluronic TM P-105 has an average molecular weight of 6500, a specific gravity of 1.05, Brookfield viscosity of 800 cps, a melting point of 42° C., and contains about 50 percent ethylene oxide repeat units. Pluronic TM F-108 has an average molecular weight of 14,000, a specific gravity of 1.06, a Brookfield viscosity of 8000, a melting point of 75° C., and contains about 80 percent ethylene oxide repeat units.

In Example 6 where Pluronic TM P-105 was used as the secondary surfactant a particle size of 0.196$\mu$ was obtained. In Example 7 where Pluronic TM F-108 was used as the secondary surfactant a particle size of 0.225μ was obtained.

EXAMPLE 8

In order to show that the polyols of this invention can be used to produce stable large particle size latices in large scale operations this experiment was conducted. About 2750 gallons (10,410 liters) of a charge composition containing 100 parts of water, 0.11 parts of potassium hydroxide (KOH), 3.0 parts of Gafac TM RE 410, 71 parts of styrene, 26 parts of butyl acrylate, 1.0 parts of methacrylic acid, 2.0 parts of acrylic acid, 0.85 parts of Sulfole TM 120, 0.3 parts of potassium persulfate, 0.6 parts of sodium hydroxide, and 0.2 parts of Pluronic TM F-127 was prepared in a glass lined 2750 gallon (10,410 liter) reactor equipped with cooling coils, baffles, and an axial flow turbine agitator.

After this charge composition was prepared the reactor was heated to 130° F. (54° C.) and the charge composition was maintained at this temperature for about 9 hours. After about 9 hours the solids content of the latex being formed had reached about 25 percent to 30 percent and the polymerization temperature was increased to 150° F. (65.6° C.). The polymerization was then allowed to continue for about 10 more hours for a total of 19 hours of polymerization time.

The latex produced had a final solids content of 50.4 percent and a particle size of 0.283μ. If the polyols of this invention are not employed as secondary surfactants then a maximum solids content of only about 35 percent can be reached. Thus, by increasing particle size a stable latex of much higher solids content can be produced.

It should be noted that a larger particle size was obtained in this large scale polymerization than was achieved in the small scale polymerization described in Example 4 which also utilized 0.2 phm of Pluronic TM F-127 as a secondary surfactant. The larger particle size that can be obtained in large scale polymerizations probably results from differences in agitation and the rate of initiation of the polymerization.

EXAMPLE 9

The procedure that was specified in Example 8 was employed in this example, except that only 0.80 parts of Sulfole TM 120 was employed as a chain transfer agent in the charge composition and that the initial polymerization temperature was 140° F. (60° C.) which was increased to 160° F. (71° C.) after about 8 hours for a total polymerization time of about 16.5 hours. In this example a solids content of 51.4 percent was obtained with a particle size of 0.310 being achieved. There was no problem with coagulum at this high solids content. The very large particle size achieved resulted in a very stable latex that has excellent properties for use in the preparation of water reducible coatings.

While certain representative embodiments and details have been shown for the purpose of illustrating the invention,, it will be apparent to those skilled in this art that various changes and modifications may be made therein without departing from the scope of the invention.

What is claimed is:

1. An improved process for producing a latex which comprises free radical aqueous emulsion polymerizing a monomer mixture which comprises, based on 100 weight percent of monomers:

(1) from about 50 to about 90 percent of at least one monomer selected from the group consisting of styrene, α-methyl styrene, and vinyl toluene;
(2) from about 10 to about 40 percent of at least one alkyl acrylate monomer wherein the alkyl moiety contains from 3 to 5 carbon atoms; and
(3) from about 1 to about 10 percent of at least one unsaturated carbonyl compound selected from the group consisting of acrylic acid, methacrylic acid, fumaric acid, itaconic acid, maleic acid, and maleic anhydride;

in the presence of at least one phosphate-ester surfactant and between about 0.01 and about 2 phm of at least one polyol which has a molecular weight between about 2,000 and about 20,000 and which has the structural formula:

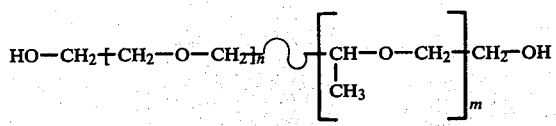

wherein n and m are integers, and wherein n is greater than m, and wherein ─∼─ indicates that the distribution of monomeric units can be random.

2. An improved process as specified in claim 1 wherein m is 0.

3. An improved process as specified in claim 1 wherein said polyols has a molecular weight of from 5,000 to 20,000.

4. An improved process as specified in claim 3 wherein said polyol has a molecular weight of from 10,000 to 15,000.

5. An improved process as specified in claim 1 wherein said polyol contains about 70 percent ethylene oxide repeat units.

6. An improved process as specified in claim 1 wherein said emulsion polymerization is carried out in the presence of from 0.03 to 0.4 phm of said polyol.

7. An improved process as specified in claim 6 wherein said emulsion polymerization is carried out in the presence of about 0.05 phm of said polyol.

8. An improved process as specified in claim 1 wherein from about 1 to about 5 phm of said phosphate ester surfactant is present.

9. An improved process as specified in claim 8 wherein from 2.5 to 3 phm of said phosphate-ester surfactant is present.

10. An improved process as specified in claim 1 wherein said polymerization is carried out at a temperature ranging between about 38° C. and 77° C.

11. An improved process as specified in claim 1 wherein said monomer selected from the group consisting of styrene, α-methyl styrene, and vinyl toluene is styrene; and wherein said alkyl acrylate monomer is butyl acrylate.

12. An improved process as specified in claim 1 wherein said monomer mixture comprises, based on 100 weight percent of monomers:
(1) about 70 percent styrene,
(2) about 26 percent butyl acrylate,
(3) about 2 percent acrylic acid, and
(4) about 1 percent methacrylic acid.

13. An improved stable large particle size latex that is useful in the manufacture of water reducible coatings, comprising:

(a) a resin which is comprised of, based on 100 weight percent of monomeric units within the resin: (1) from about 50 to about 90 percent of at least one monomer selected from the group consisting of styrene, α-methyl styrene and vinyl toluene; (2) from about 10 to about 40 percent of at least one alkyl acrylate monomer wherein the alkyl moiety contains from 3 to 5 carbon atoms; and (3) from about 1 to about 10 percent of at least one unsaturated carbonyl compound selected from the group consisting of acrylic acid, methacrylic acid, fumaric acid, itaconic acid, maleic acid and maleic anhydride;

(b) water;

(c) at least one phosphate-ester surfactant and (d) as a secondary surfactant between about 0.01 and about 2 phr of at least one polyol which has a molecular weight between about 2,000 and about 20,000 and which has the structural formula:

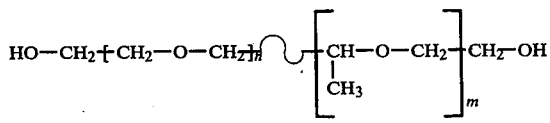

wherein n and m are integers, and wherein n is greater than m, and wherein _⌒_ indicates that the distribution of monomeric units can be random.

14. An improved latex as specified in claim 13 wherein said polyol has the structural formula:

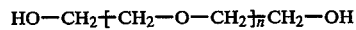

wherein n is an integer.

15. An improved latex as specified in claim 13 wherein between 0.03 and 0.4 phr of at least one polyol is employed as a secondary surfactant.

16. An improved latex as specified in claim 13 wherein said monomer selected from the group consisting of styrene, α-methyl styrene, and vinyl toluene is styrene; and wherein said alkyl acrylate monomer is butyl acrylate.

17. An improved latex as specified in claim 13 wherein at least one unsaturated carbonyl compound is acrylic acid.

18. An improved latex as specified in claim 13 wherein at least one unsaturated carbonyl compound is methacrylic acid.

19. An improved latex as specified in claim 13 wherein said resin is comprised of, based on 100 weight percent of monomeric units within said resin: (1) about 70 percent styrene; (2) about 26 percent butyl acrylate; (3) about 2 percent acrylic acid; and (4) about 1 percent methacrylic acid.

20. An improved latex as specified in claim 13 wherein said latex contains from about 2.5 to about 3 phr of at least one phosphate-ester surfactant.

* * * * *